US009525336B2

(12) United States Patent
Huang

(10) Patent No.: US 9,525,336 B2
(45) Date of Patent: Dec. 20, 2016

(54) HARMONIC CONTROL METHOD AND CIRCUIT FOR FLYBACK SWITCHING POWER SUPPLY

(71) Applicant: Silergy Semiconductor Technology (Hangzhou) LTD, Hangzhou, ZheJiang Province (CN)

(72) Inventor: Xiaodong Huang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 168 days.

(21) Appl. No.: 14/478,126

(22) Filed: Sep. 5, 2014

(65) Prior Publication Data
US 2015/0078041 A1  Mar. 19, 2015

(30) Foreign Application Priority Data

Sep. 13, 2013 (CN) .......................... 2013 1 0418554

(51) Int. Cl.
*H02M 3/335* (2006.01)
*H02M 1/42* (2007.01)
*H02M 1/00* (2006.01)

(52) U.S. Cl.
CPC ....... *H02M 1/4258* (2013.01); *H02M 3/33507* (2013.01); *H02M 2001/0025* (2013.01); *Y02B 70/126* (2013.01)

(58) Field of Classification Search
CPC ............ H02M 3/33507; H02M 1/4258; H02M 2001/0025; H02M 1/12; H02M 3/33523; H02M 3/335; H02M 1/4208
See application file for complete search history.

(56) References Cited

U.S. PATENT DOCUMENTS

| 6,163,314 | A | 12/2000 | Lin |
| 8,471,488 | B1 | 6/2013 | Hopkins et al. |
| 2004/0218405 | A1* | 11/2004 | Yamada ................ H02M 3/335 363/18 |
| 2013/0241461 | A1 | 9/2013 | Huang |
| 2014/0021879 | A1 | 1/2014 | Yu et al. |
| 2014/0062322 | A1 | 3/2014 | Yu et al. |

FOREIGN PATENT DOCUMENTS

CN     102882378 A    1/2013

\* cited by examiner

*Primary Examiner* — Harry Behm
(74) *Attorney, Agent, or Firm* — Michael C. Stephens, Jr.

(57) ABSTRACT

In one embodiment, harmonic control method for a flyback switching power supply, can include: (i) generating a sense voltage signal based on an output signal of the flyback switching power supply; (ii) generating a first compensation signal by determining and compensating an error between the sense voltage signal and a reference voltage; (iii) generating a second compensation signal by regulating the first compensation signal based on a duty cycle of a main power switch in the flyback switching power supply; and (iv) generating a control signal based on the second compensation signal and a triangular wave signal, to control the main power switch such that the output signal is substantially constant and an input current follows a waveform variation of an input voltage of the flyback switching power supply.

6 Claims, 5 Drawing Sheets

HARMONIC CONTROL METHOD AND CIRCUIT FOR FLYBACK SWITCHING POWER SUPPLY

RELATED APPLICATIONS

This application claims the benefit of Chinese Patent Application No. 201310418554.9, filed on Sep. 13, 2013, which is incorporated herein by reference in its entirety.

FIELD OF THE INVENTION

The present invention relates to power supplies, and more specifically to a harmonic control method and circuit for a flyback switching power supply.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. In this way, the output voltage and/or the output current of the switching power supply can be maintained as substantially constant. Therefore, the selection and design of the particular control circuitry and approach is very important to the overall performance of the switching power supply.

SUMMARY

In one embodiment, harmonic control method for a flyback switching power supply, can include: (i) generating a sense voltage signal based on an output signal of the flyback switching power supply; (ii) generating a first compensation signal by determining and compensating an error between the sense voltage signal and a reference voltage; (iii) generating a second compensation signal by regulating the first compensation signal based on a duty cycle of a main power switch in the flyback switching power supply; and (iv) generating a control signal based on the second compensation signal and a triangular wave signal, to control the main power switch such that the output signal is substantially constant and an input current follows a waveform variation of an input voltage of the flyback switching power supply.

In one embodiment, a harmonic control circuit for a flyback switching power supply, can include: (i) a compensation signal generating circuit configured to generate a first compensation signal by determination and compensation of an error between a sense voltage signal and a reference voltage, where the sense voltage represents an output signal of the flyback switching power supply; (ii) a signal regulating circuit configured to generate a second compensation signal by regulation of the first compensation signal based on a duty cycle of a main power switch in the flyback switching power supply; and (iii) a driving control circuit configured to generate a control signal based on the second compensation signal and a triangular wave signal, where the control signal is configured to control the main power switch such that the output signal is substantially constant an input current follows a waveform variation of an input voltage of the flyback switching power supply.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Applications of switching power supplies are becoming more widespread, and "flyback" switching power supplies in particular are favored due to advantages of relatively simple design, broad voltage adaptability, and so on. A flyback converter may be used in both AC/DC and DC/DC conversion, with galvanic isolation between the input and any outputs. A flyback converter is essentially a buck-boost type of converter with the inductor split to form a transformer, such that the voltage ratios are multiplied, and with the additional advantage of isolation. In applications when driving a plasma lamp or a voltage multiplier, the rectifying diode of the boost converter can be left out and the resulting circuit may be considered a flyback transformer. Other applications include other power supplies and light-emitting diode (LED) drivers.

Figure 1A:
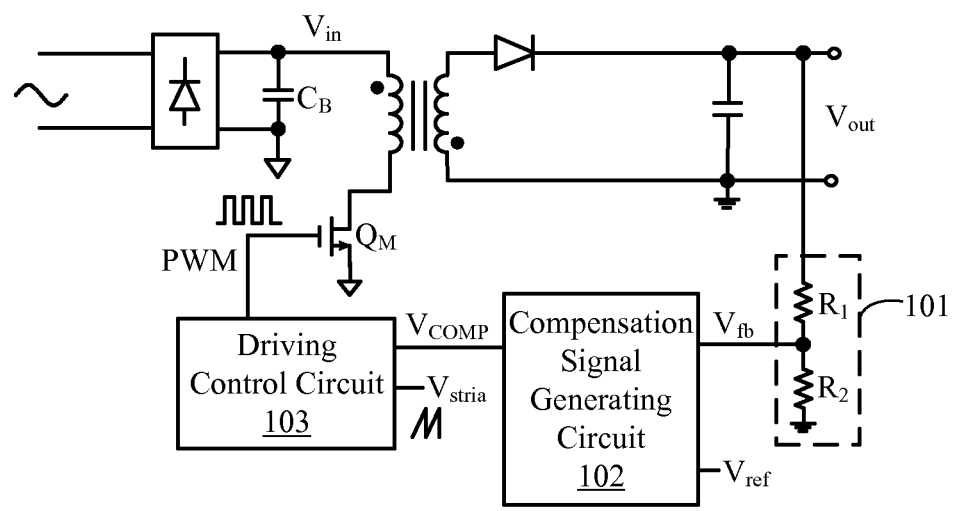
FIG. 1A is a schematic block diagram of an example flyback switching power supply.

Referring now to FIG. 1A, shown is a schematic block diagram of an example flyback switching power supply. This particular flyback switching power supply can include voltage feedback circuit 101, compensation signal generating circuit 102, and driving control circuit 103. Output voltage information of the flyback switching power supply can be determined by using a dividing resistor loop (e.g., series-coupled resistors $R_1$ and $R_2$ between output voltage $V_{out}$ and ground) as voltage feedback circuit 101. Output voltage $V_{out}$ at the output terminal of the power supply can be received by voltage feedback circuit 101, so as to generate sense voltage signal $V_{fb}$ that represents output voltage information (e.g., a voltage value) of the flyback switching power supply.

Compensation signal generating circuit 102 can receive sense voltage signal $V_{fb}$ and reference voltage $V_{ref}$ that may represent an expected output voltage, and may generate compensation signal $V_{COMP}$, which can represent an error between a present output voltage $V_{out}$ and the expected output voltage. Compensation signal $V_{COMP}$ may remain substantially constant via compensation signal generating circuit 102. Driving control circuit 103 can receive compensation signal $V_{COMP}$ and triangular wave signal $V_{stria}$, and may generate a driving control signal to control main power switch $Q_M$. In a half input voltage cycle of this example switching power supply, as compensation signal $V_{COMP}$ remains substantially constant, on time $T_{ON}$ of main power switch $Q_M$ can also be substantially constant.

Figure 1B:
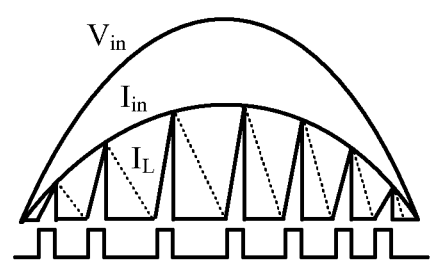
FIG. 1B is a waveform diagram of an example input current of the flyback switching power supply shown in FIG. 1A.

Referring now to FIG. 1B, shown is a waveform diagram of an example input current of the flyback switching power supply shown in FIG. 1A. In this case, a quasi-resonance control mode may be applied to obtain improved power factor correction (PFC), and to reduce switching losses and electromagnetic interference. Under this control mode, an input current waveform can be shown as FIG. 1B, and the average input current can be as per equation (1).

$$I_{in} = \frac{1}{2} \times \frac{V_{in}}{L_m} \times T_{ON} \times D \quad (1)$$

In equation (1), $V_{in}$ can be the input voltage of the power supply, $L_m$ can be the transformer's magnetizing inductance, $T_{ON}$ may remain substantially constant in each half input voltage cycle, and D can be the duty cycle of main power switch $Q_M$. When duty cycle D of main power switch $Q_M$ remains unchanged, the input current waveform can follow the variation of the input voltage. However, in some applications, there may be limitations on the switching frequency of the main power switch in flyback switching power supplies in order to reduce associated switching losses. Also, in other applications, the switching frequency should not be too low so as to avoid relatively large ripple in the output supply level. Thus, duty cycle D of the main power switch may change, and this can cause distortion on input current $I_{in}$. This distortion may result in input current $I_{in}$ taking a form other than the expected sine wave, which may reduce the system power factor, and also result in heavy harmonics that can affect the stability of the power grid/system.

In one embodiment, a harmonic control circuit for a flyback switching power supply, can include: (i) a compensation signal generating circuit configured to generate a first compensation signal by determination and compensation of an error between a sense voltage signal and a reference voltage, where the sense voltage represents an output signal of the flyback switching power supply; (ii) a signal regulating circuit configured to generate a second compensation signal by regulation of the first compensation signal based on a duty cycle of a main power switch in the flyback switching power supply; and (iii) a driving control circuit configured to generate a control signal based on the second compensation signal and a triangular wave signal, where the control signal is configured to control the main power switch such that the output signal is substantially constant an input current follows a waveform variation of an input voltage of the flyback switching power supply.

Figure 2:
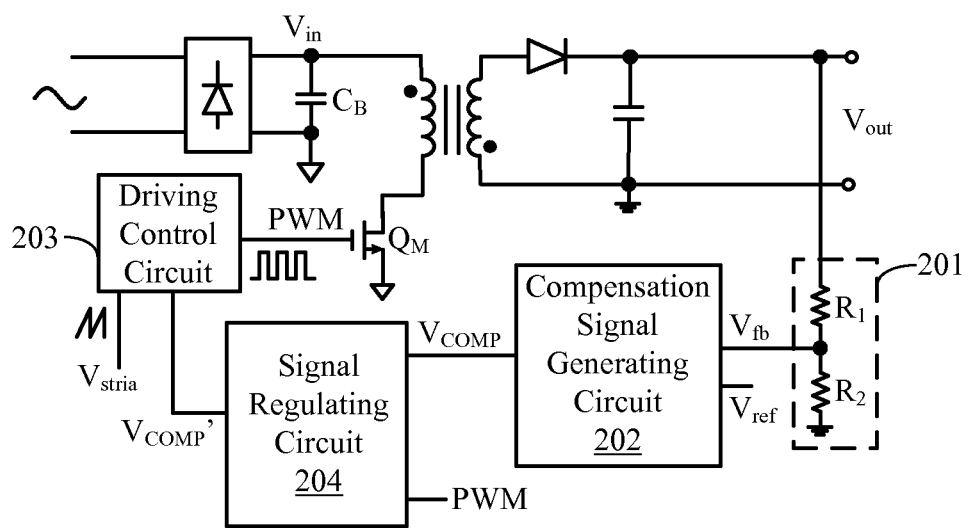
FIG. 2 is a schematic block diagram of an example harmonic control circuit for a flyback switching power supply, in accordance with embodiments of the present invention.

Referring now to FIG. 2, shown is a schematic block diagram of an example harmonic control circuit for a flyback switching power supply, in accordance with embodiments of the present invention. In this particular example, the flyback switching power supply can include voltage feedback circuit 201, compensation signal generating circuit 202, and driving control circuit 203. Here, output voltage information (e.g., output voltage value) can be detected by voltage feedback circuit 201. However, those skilled in that art will recognize that output voltage information can also be obtained by detecting output current information (e.g., an output current value). For example, output current information can be determined by sampling a primary current of the transformer in the flyback switching power supply.

In particular embodiments, a flyback switching power supply can also include a harmonic control circuit for controlling an input current harmonic of the flyback switching power supply. For example, a harmonic control circuit can include signal regulating circuit 204 coupled between compensation signal generating circuit 202 and driving control circuit 203. Compensation signal generating circuit 202 can generate substantially constant compensation signal $V_{COMP}$ and provide to signal regulating circuit 204. Signal regulating circuit 204 can receive compensation signal $V_{COMP}$, and may regulate compensation signal $V_{COMP}$ based on a duty cycle D of main power switch $Q_M$ in the flyback switching power supply. In this way, signal regulating circuit 204 can generate compensation signal $V_{COMP}'$ with a functional relationship to compensation signal $V_{COMP}$ and duty cycle D. Specifically, compensation signal $V_{COMP}'$ may be in a direct proportion to compensation signal $V_{COMP}$, while being in inverse proportion to duty cycle D. Also, signal regulating circuit 204 can obtain duty cycle information according to a control signal (e.g., pulse-width modulation [PWM] control) of main power switch $Q_M$.

Driving control circuit 203 can generate control signal PWM based on compensation signal $V_{COMP}'$ and triangular wave $V_{stria}$, to control main power switch $Q_M$. This control can be such that the output signal (e.g., $V_{out}$) of the switching power supply is substantially constant, and the input current (e.g., $I_{in}$) waveform of the flyback switching power supply varies along with the input voltage (e.g., $V_{in}$) waveform, regardless of whether the duty cycle of main power switch $Q_M$ changes. In this fashion, one or more input current harmonics can be reduced. Also, triangular wave signal $V_{stria}$ can be generated by any suitable triangular wave generating circuit, or other such approach.

In particular embodiments, a harmonic control circuit for a flyback switching power supply can generate one compensation signal (e.g., $V_{COMP}'$) by regulating another compensation signal (e.g., $V_{COMP}$) via a signal regulating circuit (e.g., 204), with a functional or proportionality relationship with the compensation signal (e.g., $V_{COMP}$) and duty cycle D. Also, a control signal (e.g., PWM) for the main power switch (e.g., $Q_M$) based on compensation signal $V_{COMP}'$, can be used to control the on time of main power switch $Q_M$ per the functional relationship with the duty cycle. For example, on time $T_{ON}$ can be inversely proportional to duty cycle D, and with reference to equation (1) above, effects on input current harmonic due to the duty cycle variation can be substantially eliminated according to the inverse proportionality relationship between on time $T_{ON}$ and duty cycle D. In this way, such effects on the input current harmonic(s) of the flyback switching power supply can be substantially eliminated.

Figure 3:
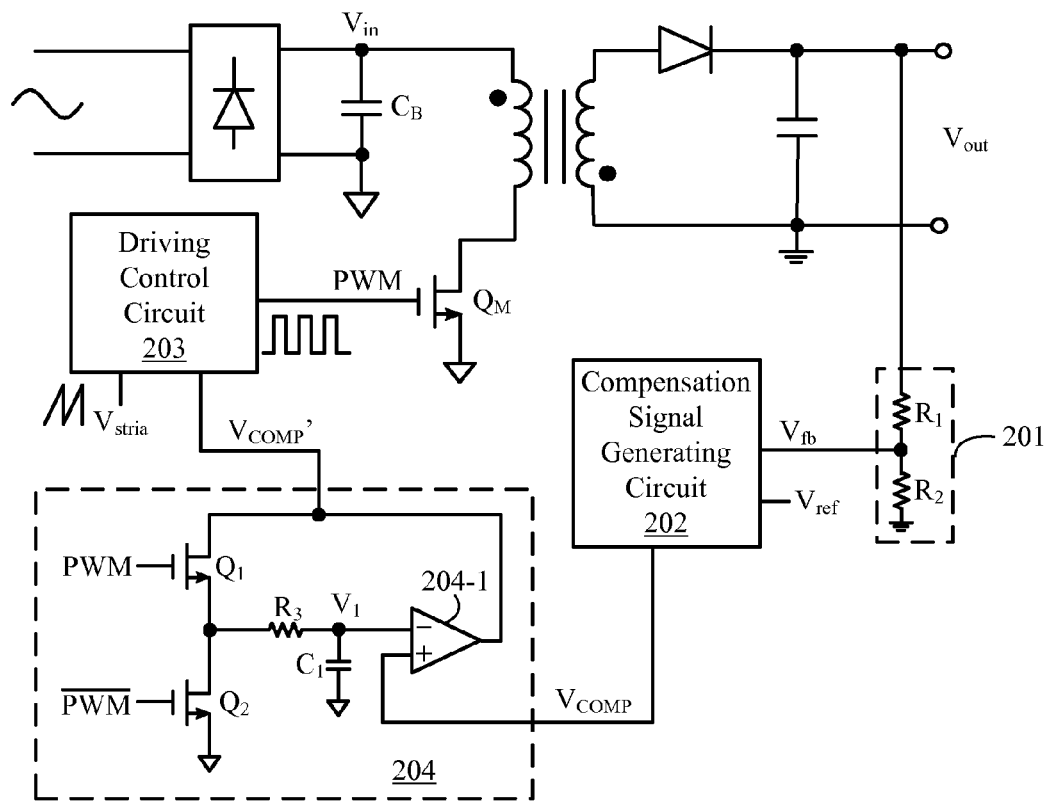
FIG. 3 is a schematic block diagram of a more detailed example harmonic control circuit for a flyback switching power supply, in accordance with embodiments of the present invention.

Referring now to FIG. 3, shown is a schematic block diagram of a more detailed example harmonic control circuit for a flyback switching power supply, in accordance with embodiments of the present invention. In this particular example, signal regulating circuit 204 can include series-connected transistors $Q_1$ and $Q_2$, an RC filter circuit made up of resistor $R_3$ and capacitor $C_1$, and operational amplifier 204-1. A drain of transistor $Q_1$ can connect to an output of operational amplifier 204-1, and a source of transistor $Q_2$ can be grounded. For example, the switching states (e.g., on/off) of transistor $Q_1$ and main power switch $Q_M$ can be the same, and the switching states of transistor $Q_2$ and main power switch $Q_M$ can be opposite. Specifically, transistor $Q_1$ can be controlled by control signal PWM, and transistor $Q_2$ can be controlled by an inverted version of control signal PWM. Also, resistor $R_2$ can connect to a common node of transistors $Q_1$ and $Q_2$, and to ground through capacitor $C_1$. Further, a voltage across capacitor $C_1$ can be configured as voltage signal $V_1$.

Operational amplifier 204-1 can receive voltage signal $V_1$, and compensation signal $V_{COMP}$, and may output compensation signal $V_{COMP}'$. Compensation signal $V_{COMP}'$ can be received at the drain of transistor $Q_1$, and may be "chopped" by a chopper circuit that includes transistors $Q_1$ and $Q_2$, to generate voltage signal $V_1$ that can be further filtered through an RC filter circuit that includes resistor $R_3$ and capacitor $C_1$. According to the relationship between switching states of transistor $Q_1$, transistor $Q_2$, and main power switch $Q_M$, the relationship between voltage signal $V_1$ and compensation signal $V_{COMP}'$ can be as below in equation (2).

$$V_1 = V_{comp}' \times D \tag{2}$$

Here, D can be the duty cycle of main power switch $Q_M$. Also, the input terminals of operational amplifier 204-1 can receive voltage signal $V_1$ and compensation signal $V_{COMP}$, and the voltage across these two input terminals can be equal according to the "virtual-short" principle. Along these lines, equation (3) can be obtained, as below.

$$V_{comp}' \times D = V_{comp} \tag{3}$$

Compensation signal $V_{COMP}'$ can be obtained by converting equation (3) into equation (4), as below.

$$V'_{comp} = \frac{V_{comp}}{D} \tag{4}$$

From equation (4) that, compensation signal $V_{COMP}'$ can be in direct proportion to compensation signal $V_{COMP}$ and in inverse proportion to duty cycle D. According to operation principles of the flyback switching power supply in this example, the relationship between on time $T_{ON}$ of main power switch $Q_M$ and compensation signal $V_{COMP}'$ can be as shown below in equation (5).

$$T_{ON} = K \times V'_{comp} = K \times \frac{V_{comp}}{D} \tag{5}$$

The average input current can be obtained by placing equation (5) into equation (1), as shown below in equation (6).

$$I_{in} = \frac{1}{2} \times \frac{V_{in}}{L_m} \times \left(K \times \frac{V_{comp}}{D}\right) \times D = \frac{1}{2} \times \frac{V_{in}}{L_m} \times K \times V_{comp} \tag{6}$$

It can be seen from equation (6) that, by applying the harmonic control circuit of particular embodiments, the average input current may not have a substantial relationship with duty cycle D, and $V_{COMP}$ can remain substantially constant in the half input voltage cycle, as $L_m$ is fixed and K is a proportionality coefficient. Therefore, no matter if the duty cycle changes or not during operation of the flyback switching power supply, the input current waveform can substantially follow the input voltage variation to be a sine wave. This can improve and/or correct the power factor, and largely reduce system harmonics. In this way, harmonic control of particular embodiments can effectively eliminate effects on input current caused by duty cycle variation with relatively simple control circuitry and low product costs.

In addition, particular embodiments also include a control chip or integrated circuit for a flyback switching power supply, which can include a compensation signal generating circuit, a driving control circuit, and a harmonic control circuit. Such a control chip may have advantages of relatively high power factor and low harmonics. Further, particular embodiments can also include a flyback switching power supply that includes a power stage circuit, a compensation signal generating circuit, a driving control circuit, and a harmonic control circuit, with the same or similar advantages.

In one embodiment, harmonic control method for a flyback switching power supply, can include: (i) generating a sense voltage signal based on an output signal of the flyback switching power supply; (ii) generating a first compensation signal by determining and compensating an error between the sense voltage signal and a reference voltage; (iii) generating a second compensation signal by regulating the first compensation signal based on a duty cycle of a main power switch in the flyback switching power supply; and (iv) generating a control signal based on the second compensation signal and a triangular wave signal, to control the main power switch such that the output signal is substantially constant and an input current follows a waveform variation of an input voltage of the flyback switching power supply.

Figure 4:
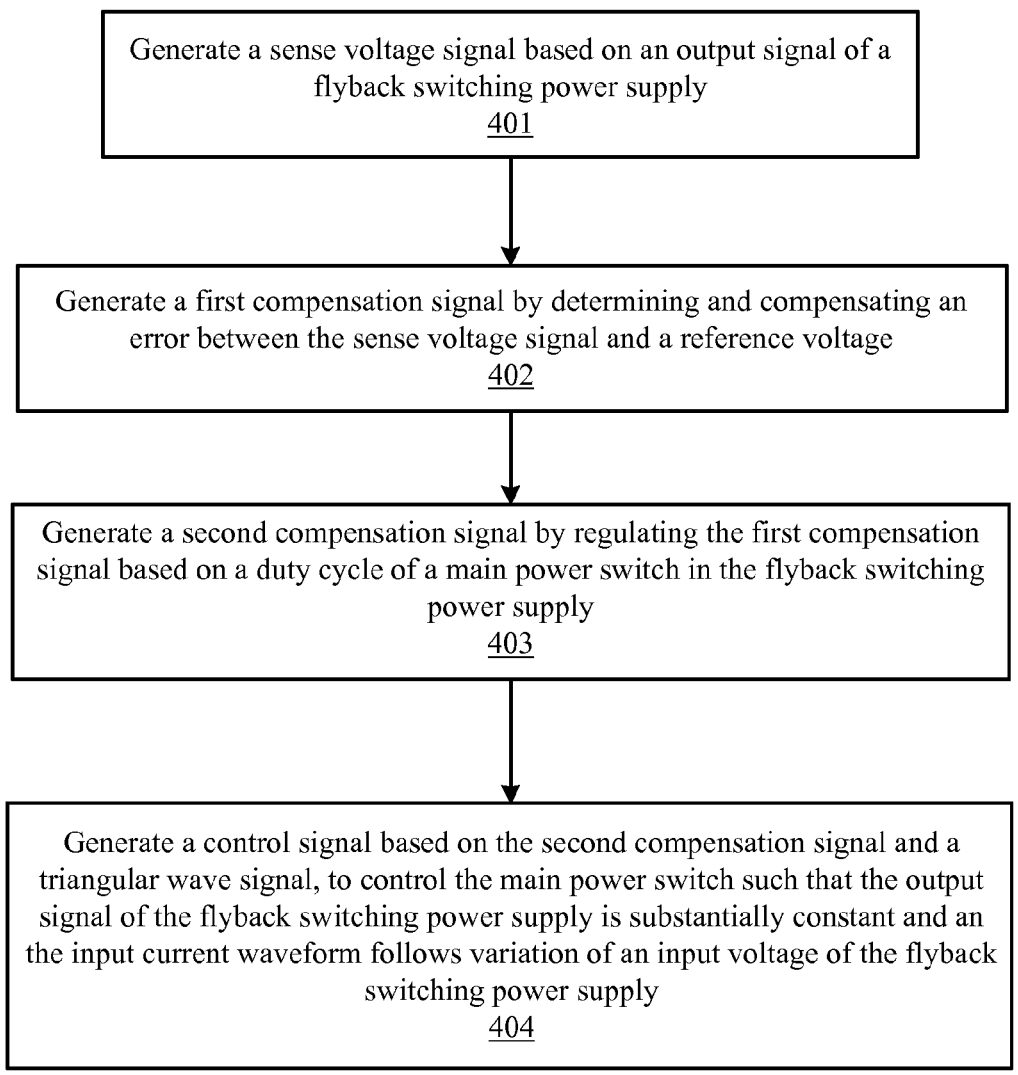
FIG. 4 is a flow diagram of example harmonic control for a flyback switching power supply, in accordance with embodiments of the present invention.

Referring now to FIG. 4, shown is a flow diagram of example harmonic control for a flyback switching power supply, in accordance with embodiments of the present invention. In some applications, the harmonic control of particular embodiments can be used to control input current harmonics in a flyback switching power supply. At 401, a sense voltage signal (e.g., $V_{fb}$) can be generated based on an output signal (e.g., $V_{out}$) of the flyback switching power supply. At 402, a first compensation signal (e.g., $V_{COMP}$) can be generated by determining and compensating an error between the sense voltage signal and a reference voltage (e.g., $V_{ref}$). At 403, a second compensation signal (e.g., $V_{COMP}'$) can be generated by regulating the first compensation signal based on a duty cycle of a main power switch (e.g., $Q_M$) in the flyback switching power supply. At 404, a control signal (e.g., PWM) can be generated based on the second compensation signal and a triangular wave signal (e.g., $V_{stria}$), to control the main power switch such that the output signal is substantially constant, and an input current follows a waveform variation of an input voltage of the flyback switching power supply.

In addition, the second compensation signal can be in direct proportion to the first compensation signal, and in inverse proportion to the duty cycle of the main power switch of the flyback switching power supply. In this way, harmonic control circuits and methods can regulate a substantially constant first compensation signal through a signal regulating circuit (e.g., 204), to generate a second compensation signal that is inversely proportional to the duty cycle. Thus, the on time of the main power switch can be inversely proportional to the duty cycle, in order to substantially avoid input current harmonics due to duty cycle variation.

The above describes the harmonic control circuits and methods for a flyback switching power supply in particular embodiments. Those skilled in the art will recognize that other techniques, structures, circuit layout, and/or components can also or alternatively be applied or utilised in particular embodiments. The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A harmonic control method for a flyback switching power supply, the method comprising:
   a) generating a sense voltage signal based on an output signal of said flyback switching power supply;
   b) generating a first compensation signal by determining and compensating an error between said sense voltage signal and a reference voltage;
   c) generating a second compensation signal by regulating said first compensation signal based on a duty cycle of a main power switch in said flyback switching power supply, wherein said second compensation signal is in direct proportion to said first compensation signal, and said second compensation signal is in inverse proportion to said duty cycle; and
   d) generating a control signal based on said second compensation signal and a triangular wave signal, to control said main power switch such that said output signal is substantially constant and an input current follows a waveform variation of an input voltage of said flyback switching power supply.

2. A harmonic control circuit for a flyback switching power supply, the harmonic control circuit comprising:
   a) a compensation signal generating circuit configured to generate a first compensation signal by determination and compensation of an error between a sense voltage signal and a reference voltage, wherein said sense voltage represents an output signal of said flyback switching power supply;
   b) a signal regulating circuit configured to generate a second compensation signal by regulation of said first compensation signal based on a duty cycle of a main power switch in said flyback switching power supply, wherein said second compensation signal is in direct proportion to said first compensation signal, and said second compensation signal is in inverse proportion to said duty cycle; and
   c) a driving control circuit configured to generate a control signal based on said second compensation signal and a triangular wave signal, wherein said control signal is configured to control said main power switch such that said output signal is substantially constant and an input current follows a waveform variation of an input voltage of said flyback switching power supply.

3. The harmonic control circuit of claim 2, wherein said signal regulating circuit is configured to receive said control signal to determine said duty cycle of said main power switch.

4. The harmonic control circuit of claim 2, wherein said signal regulating circuit comprises:
   a) a first transistor having a drain coupled to an output of an operational amplifier, a second transistor having a grounded source, wherein switching states of said first transistor and said main power switch are the same, and wherein switching states of said second transistor and said main power switch are opposite;
   b) a resistor coupled to a common node of said first and second transistors, and to ground through a capacitor; and
   c) said operational amplifier being configured to receive a voltage signal across said capacitor, and said first compensation signal, and to output said second compensation signal.

5. An integrated control chip, comprising:
   a) said harmonic control circuit of claim 2; and
   b) said flyback switching power supply.

6. A flyback switching power supply, comprising:
   a) said harmonic control circuit of claim 2; and
   b) a power stage circuit comprising said main power switch.

* * * * *